United States Patent [19]

Brandenstein et al.

[11] Patent Number: 5,078,656
[45] Date of Patent: Jan. 7, 1992

[54] SPRING ADJUSTABLE TENSIONING DEVICE

[75] Inventors: Manfred Brandenstein, Eussenheim; Wolfgang Friedrich; Roland Haas, Hofheim; Gerhard Herrmann, Schweinfurt, all of Fed. Rep. of Germany

[73] Assignee: SKF GmbH, Schweinfurt, Fed. Rep. of Germany

[21] Appl. No.: 495,348

[22] Filed: Mar. 19, 1990

[30] Foreign Application Priority Data

Mar. 17, 1989 [DE] Fed. Rep. of Germany ......... 3908818

[51] Int. Cl.⁵ .............................................. F16H 7/08
[52] U.S. Cl. .................................................. 474/112
[58] Field of Search ..................... 474/101, 109–117, 474/133, 135

[56] References Cited

U.S. PATENT DOCUMENTS

| | | | |
|---|---|---|---|
| 2,337,591 | 9/1941 | Coulson | 474/112 |
| 4,618,335 | 10/1986 | Brandenstein et al. | 474/112 |
| 4,634,407 | 1/1987 | Holtz | 474/112 |
| 4,904,230 | 2/1990 | Kawashima et al. | 474/112 |
| 4,923,435 | 5/1990 | Kadota et al. | 474/112 |

Primary Examiner—Thuy M. Bui

[57] ABSTRACT

A tensioning device for drive belts includes a pin pivotable about an axis and having an eccentric surface on which a cam is pivotally mounted. A roller adapted to engage a belt is rotatably mounted on the cam. The cam pivots in reaction to forces on a spring acting between the cam and pin. The spring may be preloaded to a specific operating point by rotation of the pin. Markings or projections acting as stops facilitate adjustment of the preloading of the spring.

4 Claims, 1 Drawing Sheet

SPRING ADJUSTABLE TENSIONING DEVICE

FIELD OF THE INVENTION

The invention is directed to a spring-adjustable tensioning device, for example for a belt drive arrangement.

BACKGROUND OF THE INVENTION

In a tensioning device of one type, as disclosed in U.S. Pat. No. 2 337 591, a cam is pivotally mounted on a pin and supports a tension roller adapted to rotate on its outer surface. A flat coil spring extends between a projection extending from the side of the cam and the pin for preloading the tension roller with respect to the pin in the pivotal direction, thus allowing the cam to pivot during operation, to maintain an even tension on the drive belt. Due to the fixed position of the tensioning device, tolerances in the length of the drive belt or similar effects resulting from a non-uniform arrangement of the driving gear parts or variations in diameter of the driving gear, can be compensated only by subsequent adjustment within the effective pivot range of the tensioning device. The range of subsequent adjustment, however, is greatly limited and, for an actual pivot angle of about 60 degrees, it is often less than is needed to compensate for tolerances, in particular during operation. In addition, the tension force of the tensioning device depends on the pivot angle so that the required compensation of tolerances within the pivot rang always results in different tension forces. In order to eliminate this disadvantage, the above arrangement enables the adjustment of the spring end on the side of the pin by means of a slotted disk. Such adjustment cannot be reliably implemented during the mounting process, however, and may lead to unsolvable problems in the crowded space usually available in motor vehicles.

SUMMARY OF THE INVENTION

The object of this invention is to provide a spring-adjustable tensioning device of the above discussed type which can be easily adjusted by simple means during mounting, and for which a mean operating point pre-determined during mass production can be achieved within the pivot range while the belt tension remains uniform.

The object is achieved by the provision of a tensioning device wherein the pin is adjustable via an eccentrically positioned pivot bearing and includes means for employing an adjusting tool.

With this arrangement, the tension roller is brought against the drive belt by way of two successive eccentric arrangements. The first eccentric arrangement comprises a mounting pin for individual adjustment during assembly. This eccentric arrangement supports the tension roller. It has, for example, an eccentric hole for a threaded bolt which serves to attach it to an engine block or other machine element. It can be pivoted about the bolt with a adjusting tool when the threaded bolt is loosened, and serves to compensate for all the tolerances of the belt drive mechanism. In the process of pivoting the first eccentric arrangement, moreover, a spring acts on a second eccentric arrangement to load the second eccentric arrangement until a pre-determined mean operating tension is reached. At this operating tension, the spring force creating the pre-tension of the drive belt is also uniform, so that mass production can consistently yield drive belts which are uniformly tensioned, notwithstanding the inevitable manufacturing tolerances.

In addition, in the tensioning device according to the invention, the operating paths are always uniform in the pivotal direction, both in the direction for subsequent adjustment and in the opposite direction, even in view of the mass production tolerances referred to above. The cam rotates on bearings on the casing of the pin and carries the tension roller. The spring acts between the pin and the cam in the pivotal direction. The invention thereby provides an extremely compact tensioning device with small outside dimensions and that is very adaptable in use due to the increased adjustment possibilities. Both the pin with its eccentric action and the cam itself, for example, may be incorporated in the bearing hole of the tension roller, so that at least the radial dimensions of the tensioning device will not exceed those of the tension roller.

According to a further characteristic of the invention the cam and the pin have markings or the like for setting the pre-determined tension, or the cam may be equipped with a projection acting as a stop for the adjusting tool. When the tensioning device is tensioned against the drive belt and the threaded bolt is loosened, the adjusting tool causes the pin to pivot around the bolt. The contact between the tension roller and the drive belt, and the resulting initial reaction force, is followed by a pivoting motion of the cam with respect to the pin, thereby loading the spring. Both the pin and the cam carry markings which may be aligned. The pin is fixed in this position by tightening the bolt. As a result, a mean operating tension is set. This target setting can also be achieved by, for example, a projection on the cam acting as a stop for the adjusting tool when the desired pre-determined tension is reached.

In an advantageous embodiment of the invention the markings or the like are applied to a position corresponding to a specific pre-determined tension of the spring. In this case, the markings, projections or the like, are applied after the tensioning device has been assembled. For that purpose, the tension roller is preloaded with a specific force which results in a certain relative pivot position between the cam and the pin. The markings or projections, e.g., a stud, which will subsequently be aligned, are made or established at this position. The purpose of this step is to enable reference to this setting when the tensioning device is tensioned after mounting, in order to always achieve the desired adjustment force within a very strict tolerance range.

BRIEF DESCRIPTION OF THE DRAWING

In order that the invention may be more clearly understood, it will now be disclosed in greater detail with reference to the accompanying drawing, wherein.

DETAILED DISCLOSURE OF THE INVENTION

Figure 1:
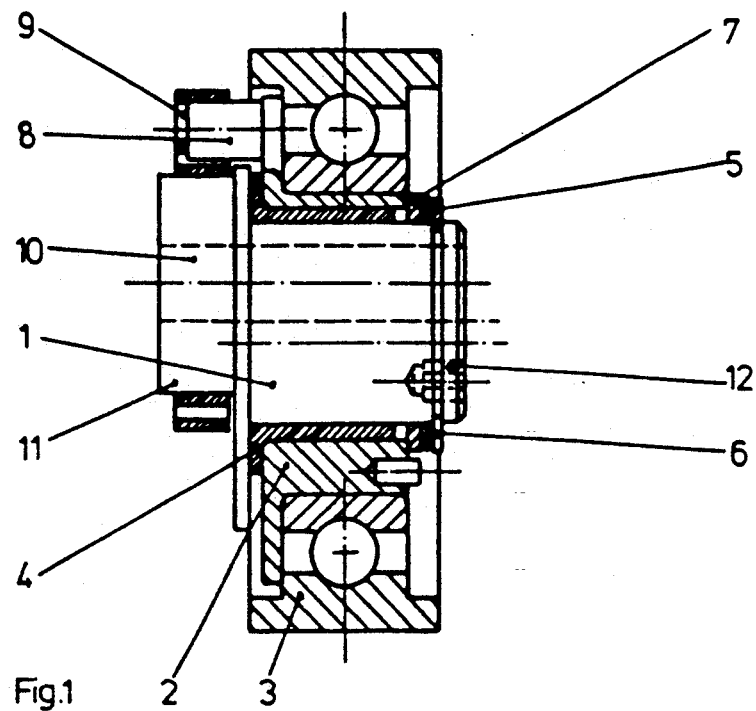
FIG. 1 is a partial longitudinal section of a tensioning device with a pivoting pin and a cam, in accordance with the invention.

The tensioning device shown in the figures is comprised of a pin 1, a cam 2 and a tension roller 3. The tension roller is mounted on bearings to rotate around the cam 2. A flanged casing 4 made of a friction bearing material is positioned between the cam 2 and the pin 1, to enable the cam 2 to be pivoted around the pin 1 while it is supported both radially and axially. In order to hold the cam on the pin, and in order to attenuate any pivoting movement of the cam with respect to the pin, a friction disk 7 is held against the front of the cam 2 under axial pre-tension by a retaining ring 6 in an annular groove in the pin, and a spring washer 5 held between the ring 6 and the cam.

Figure 2:
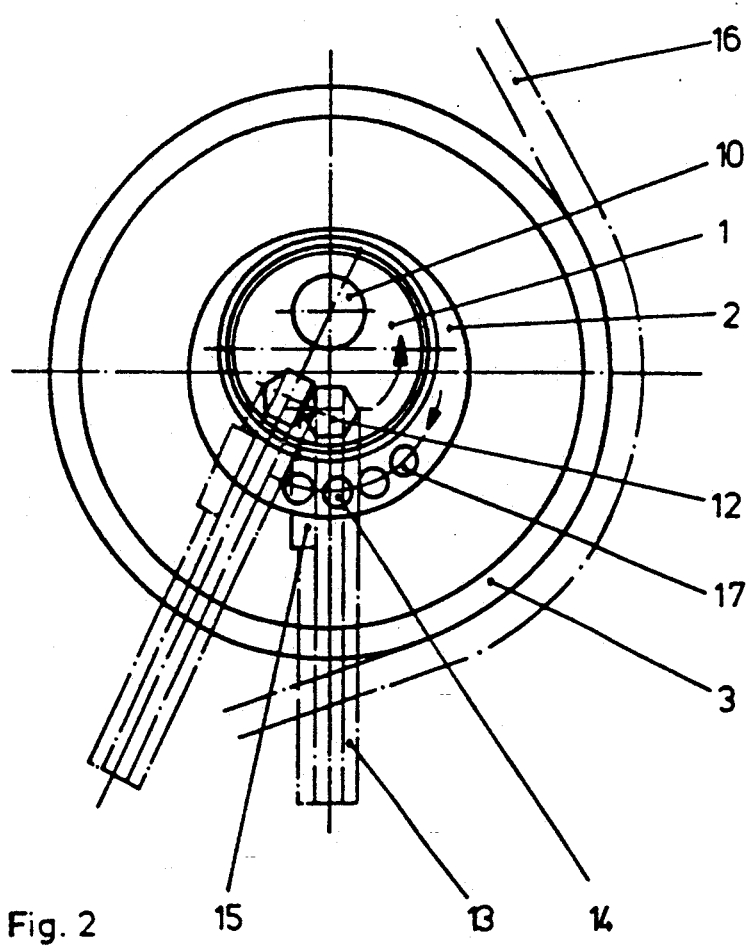
FIG. 2 is a top view of the tensioning device shown in FIG. 1, with a adjusting tool and a stop.

A follower 8 projects axially from a flange at the rear of the cam 2. One end of a flat coil spring 9 is connected to the follower 8. This spring encircles the rear section 11 of the pin that is adapted to be mounted to the engine block (not shown), the section 11 being concentric to the mounting hole 10 of the pin 1. With this arrangement, pivoting motion of the cam 2 can only be effected during operation by forces exerted thereon by the flat coil spring 9. The carrying or front section of the pin 1 is eccentric with respect to the mounting hole 10 so that the tensioning device pivots about the axis of the mounting hole when the pin 1 is moved around a bolt (not illustrated) extending through the hole 10. A similar pivoting motion occurs upon rotation of the cam 2. The two pivoting motions provide a compound action. The positions shown in FIGS. 1 and 2 represent the most extended radial setting of the tension roller 3 with respect to the mounting hole 10.

A hexagonal socket 12 is provided in the front of the pin, diagonally across from the mounting hole 10, for receiving an adjusting tool 13 such as an Allen wrench. As shown in FIG. 2, with the adjusting tool in the leftmost position the tensioning device is in an untensioned state, while in the rightmost position of the adjusting tool the tensioning device is a tensioned state. In this position, as also shown in FIG. 1, a pin 14 is inserted in a hole in the front of the cam 2 to serve as a stop against a projection 15 extending from the tool 13. In order to adjust the tensioning device, when the tension roller is already lying against the belt, as in the leftmost illustrated position, the bolt in the hole 10 is first loosened, and the tool 13 is then pivoted counterclockwise in the direction of the arrow on the pin 1. As a result of this pivoting of the pin 1, the radial forces from the belt acting on the tension roller increase, so that, due to the interaction between the eccentric surfaces the cam 2 is pivoted in the opposite direction about the axis of the hole 10, as illustrated by the arrow in FIG. 2 on the cam 2. This action applies a force to the spring 9.

In the tensioned position a stud 14 (also shown in FIG. 1) inserted in a hole in the front surface of cam 2 forms a stop for the projection 15 extending from the adjusting tool 13. Thus, the pin 1 is first pivoted counter-clockwise via the adjusting tool in the direction of the arrow thereon, around the bolt, while the tension roller 3 engages the drive belt 16. In the process, assuming the tension roller is not moving, or is barely moving in the direction of the drive belt 16, cam 2 pivots in the direction opposite that of the pin 1. Consequently, stud 14 moves toward the projection 15 of the adjusting tool 13. In this position the bolt is tightened and the position of the pin 1 is consequently fixed.

The front of the cam 2 contains several closely spaced holes 17 for receiving the stud 14. During the testing of the tensioning device after it is manufactured, the flat coil spring 9 is preloaded in the same manner with a specific force, and the stud 14 is inserted in the resulting hole 17.

While the invention has been disclosed and described with reference to a single embodiment, it will be apparent that variations and modification may be made therein, and it is therefore intended in the following claims to cover each such variation and modification as falls within the true spirit and scope of the invention.

What is claimed is:

1. In a spring-adjustable tensioning device having a cam rotatably mounted on a mounting pin via bearings, a spring acting in a circumferential direction on the cam for preloading the cam, and a tension roller mounted via bearings to rotate on the cam, the improvement wherein the pin has a pivot axis, said cam is rotatably mounted on a surface of said pin that is eccentric with respect to said axis, and said pin comprises means for pivotally adjusting said pin about said axis.

2. The tensioning device of claim 1, wherein said adjusting means comprises means for adjusting the cam and the pin to a pre-determined tension setting.

3. The tensioning device of claim 1 wherein said adjusting means comprises a projection on said cam for serving as a stop, in the circumferential direction, for an adjusting tool adapted to pivot said pin about said axis.

4. The tensioning device of claim 2 wherein said means for adjusting said cam and pin to a pre-determined tension setting comprises markings on said cam and pin, said markings being positioned to be alignable upon rotation of said pin about said axis, for applying a specific pre-determined force to the spring.

* * * * *